(12) United States Patent
Horwitz

(10) Patent No.: US 6,724,439 B1
(45) Date of Patent: Apr. 20, 2004

(54) LOW COST VSB ENCODER AND RF MODULATOR FOR SUPPLYING A SUBSTANTIALLY 6 MHZ VSB SIGNAL TO DIGITAL TELEVISION RECEIVER

(75) Inventor: Thomas P. Horwitz, Elgin, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 473 days.

(21) Appl. No.: 09/632,545

(22) Filed: Aug. 4, 2000

(51) Int. Cl.[7] .............................. H04N 5/40; H04N 5/38
(52) U.S. Cl. ........................ 348/724; 348/723; 348/608
(58) Field of Search ................................. 348/555, 558, 348/725, 726, 727, 728, 614, 723, 724, 607, 608; 375/321; 455/204, 45; H04N 5/44, 5/46, 5/21, 5/455, 5/38, 5/40

(56) References Cited

U.S. PATENT DOCUMENTS

| | | | |
|---|---|---|---|
| 4,617,537 A | | 10/1986 | Nossek |
| 5,588,025 A | * | 12/1996 | Strolle et al. ............... 375/316 |
| 5,612,975 A | * | 3/1997 | Becker et al. ............... 375/319 |
| 5,696,796 A | | 12/1997 | Poklemba |
| 5,724,396 A | * | 3/1998 | Claydon et al. ............. 375/355 |
| 5,764,701 A | * | 6/1998 | Horwitz ....................... 375/301 |
| 6,052,701 A | * | 4/2000 | Koslov et al. ............... 708/313 |
| 6,307,887 B1 | * | 10/2001 | Gabriel .................. 375/240.16 |
| 6,343,207 B1 | * | 1/2002 | Hessel et al. ................. 455/86 |
| 6,430,234 B1 | * | 8/2002 | Perlow ........................ 348/726 |
| 6,559,898 B1 | * | 5/2003 | Citta et al. .................. 348/723 |

FOREIGN PATENT DOCUMENTS

| | | |
|---|---|---|
| EP | 0 323 675 | 7/1989 |
| EP | 0 853 409 | 7/1998 |
| WO | WO 99/40721 | 8/1999 |
| WO | WO 00/49710 | 8/2000 |
| WO | WO 01/78392 | 10/2001 |

* cited by examiner

Primary Examiner—Sherrie Hsia

(57) ABSTRACT

A system supplies a compressed digital signal to a digital television receiver and includes a source of compressed baseband signal. An encoder encodes the baseband signal in a digital format, and the baseband signal has a frequency. The frequency of the encoded baseband signal is shifted by a first frequency shifter. A first interpolator interpolates an output of the first frequency shifter, a second interpolator that interpolates an output of the first interpolator, and a third interpolator that interpolates an output of the second interpolator. A second frequency shifter shifts a frequency of an output of the third interpolator to produce a signal at a selected channel.

38 Claims, 7 Drawing Sheets

LOW COST VSB ENCODER AND RF MODULATOR FOR SUPPLYING A SUBSTANTIALLY 6 MHZ VSB SIGNAL TO DIGITAL TELEVISION RECEIVER

BACKGROUND OF THE INVENTION AND PRIOR ART

This invention relates generally to digital VSB (vestigial side band) television receivers and specifically to a simple low cost system for coupling a digital VSB signal from any of a plurality of sources of a digital signal (such as an MPEG—Motion Picture Experts Group—digital signal) to a digital VSB television receiver. While the description is directed to a VSB digital format, it should be understood that the invention in its broader aspects is not limited to a particular digital format.

The recently adopted Digital Television Standard specifies a VSB subsystem having a terrestrial broadcast mode (8 VSB) and a high data rate mode (16 VSB). There are other VSB modes available, namely 2 VSB, 4 VSB and 8 VSB (non terrestrial). The 8 VSB terrestrial mode has the data carrying capability of 4 VSB. (The Trellis coding that is added for the terrestrial environment creates the additional modulation levels.) The digital data signal for video is MPEG encoded and for audio is Dolby AC-3 processed and must be subjected to decompression before application to conventional video and audio circuitry. For terrestrial broadcasting, the data signal is: randomized; subjected to Reed-Solomon (R/S) type encoding for error correction; interleaved; Trellis encoded; multiplexed with segment sync and field sync; supplied with a DC pilot; subjected to pre-equalization filtering; modulated; and RF upconverted for transmission. The digital television receiver includes a tuner and a VSB demodulator for developing the baseband signal, which is in compressed form. The demodulated signal is applied to an equalizer for equalizing the received signal. The baseband signal is applied to a transport demultiplexer which directs the data to an appropriate MPEG decoder and a Dolby decoder for recovering the video and audio in proper form for application to video and audio processing circuitry. Digital signals may be supplied to digital receivers by over-the-air transmission sources. Digital signals from other sources, such as DVD (digital video disk) players, VCR's (video cassette recorders), PC's (personal computers), digital cable boxes, satellite receivers and the like will also be supplied to digital television receivers, as is the case for present analog television receivers.

In an analog system, it is well known that coupling the signal from a VCR or other video source to a baseband input of a television receiver (if one is available) yields results superior to those achieved by modulating the signal to RF channel 3 or RF channel 4 and supplying it to the tuner input of the television receiver. This baseband coupling, however, does not necessarily produce superior results in a digital environment in which case the distance between the baseband signal source and the television receiver must be kept relatively short. In an analog system, it is also well known to supply double sideband signals to a receiver.

In accordance with the invention described in U.S. application Ser. No. 09/300,299 filed Apr. 27, 1999, U.S. Pat. No. 6,559,898, a compressed baseband digital signal is encoded in a given format for digital transmission and is modulated onto an RF carrier for direct application via a cable or wireless link to the RF input of a digital television receiver. The RF signal, which is at a low power level and has a less-than-nominal bandpass, takes advantage of the front end signal processing that is built into the digital television receiver. Signal impairments, due to the less-than-nominal bandpass characteristic and noise introduced during transmission, that are below a given threshold are corrected by the correction circuitry in the digital television receiver front end. The low signal power, the corrective circuitry for the digital signal, and the benign environment of the communications link enable components and circuits of much lower tolerance (and cost) to be used in the encoding and modulating process implemented by the other sources described above. The result is an modulator that is very low cost and very effective in coupling a digital signal to a digital television receiver over an RF channel.

The present invention is directed to another arrangement for providing a digital signal to a digital receiver.

SUMMARY OF THE INVENTION

In accordance with a first aspect of the invention, a system for supplying a compressed digital signal to a digital television receiver comprises a source of compressed baseband signal, an encoder, first and second frequency shifters, and first, second, and third interpolators. The encoder encodes the baseband signal in a digital format, wherein the baseband signal has a frequency. The first frequency shifter shifts the frequency of the encoded baseband signal. The first interpolator interpolates an output of the first frequency shifter, the second interpolator interpolates an output of the first interpolator, and the third interpolator interpolates an output of the second interpolator. The second frequency shifter shifts a frequency of an output of the third interpolator.

In accordance with another aspect of the invention, a method of supplying a compressed digital signal to a digital television receiver comprises the following: encoding a baseband signal in a digital format, wherein the baseband signal has a symbol frequency; increasing the symbol frequency of the encoded baseband signal to produce an intermediate frequency signal, wherein the increasing of the symbol frequency of the encoded baseband signal includes three interpolations of the encoded baseband signal; and, modulating the intermediate frequency signal with a channel selection frequency signal so as to produce an output signal having the frequency of a selected channel.

In accordance with still another aspect of the invention, an electrical signal is produced by (i) encoding a signal in a digital television format, wherein the signal, has a symbol frequency $f_1$, (ii) shifting the frequency of the encoded signal by $f_1/4$, (iii) increasing the frequency of the shifted encoded signal to produce an intermediate signal, and (iv) modulating the intermediate frequency signal with a channel selection frequency signal so as to produce the electrical signal at the frequency of a selected channel.

BRIEF DESCRIPTION OF THE DRAWINGS

These and other features and advantages of the invention will be apparent upon reading the following description in conjunction with the drawing, in which.

DESCRIPTION OF THE PREFERRED EMBODIMENT

Figure 1:
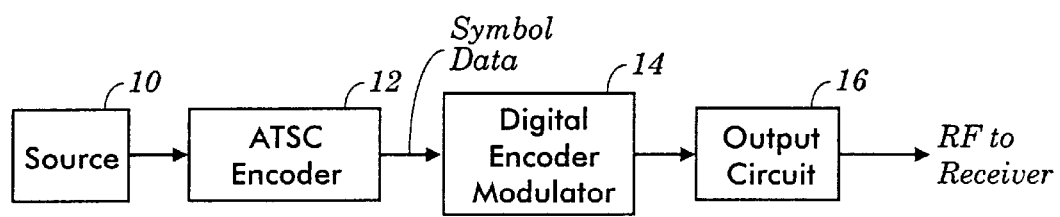
FIG. 1 is a simplified block diagram of a digital remodulator in accordance with the present invention.

As shown in FIG. 1, a source 10 provides a digital MPEG encoded signal. The source 10 may be any of a number of different types of sources. For example, the source 10 may comprise a satellite receiver, a VCR, a DVD, a digital cable box, a PC, etc. The output of the source 10 is an MPEG (and Dolby AC-3) encoded digital signal at baseband frequency. This baseband signal may be applied directly to a baseband input of a digital television receiver. However, in accordance with the present invention, the baseband signal is applied to an ATSC encoder 12 which subjects the signal to interleaving, randomizing, R/S error encoding, and/or Trellis encoding. Field and segment syncs are added and, while not indicated, a pilot is inserted and equalization filtering is employed. (See ATSC Standard A/53, ATSC Digital Television Standard for a detailed description of these operations.)

Figure 4:
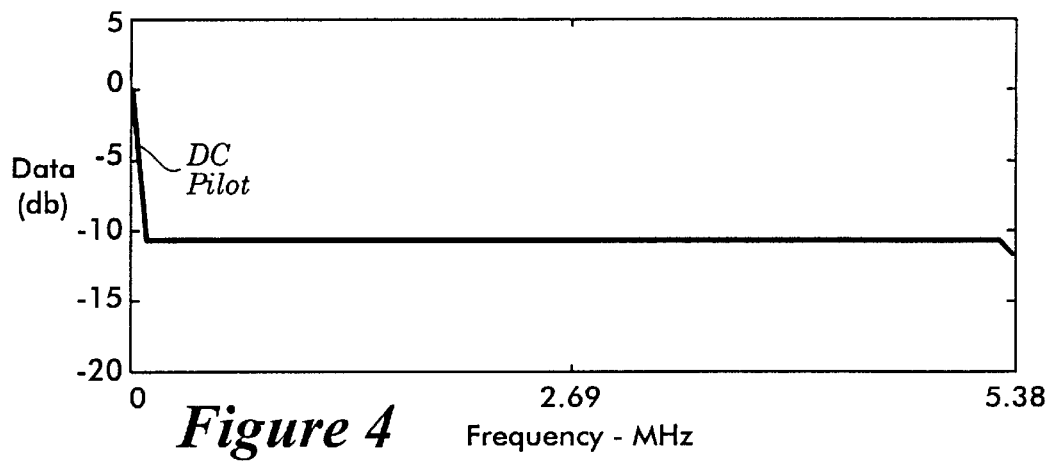
FIG. 4 is a curve illustrating the frequency spectrum of the encoded baseband signal supplied to the VSB digital signal modulator of FIGS. 2 and 3.

The ATSC encoder 12 supplies symbol data to a digital modulator 14 which remodulates the symbol data onto a selected RF channel, such as channel 3 or 4. Following remodulation, an output circuit 16 processes the remodulated data and supplies the processed remodulated data over an RF output to a digital receiver such as a digital television. The symbol data provided by the ATSC encoder 12 has a 10.76 MHZ datarate and its spectrum is flat across the entire frequency band. This data has a small DC offset which is used as a pilot, and the symbol data width is seven bits. FIG. 4 shows the symbol data frequency spectrum taken with a 128 point discrete Fourier Transform (DFT).

Figure 2:
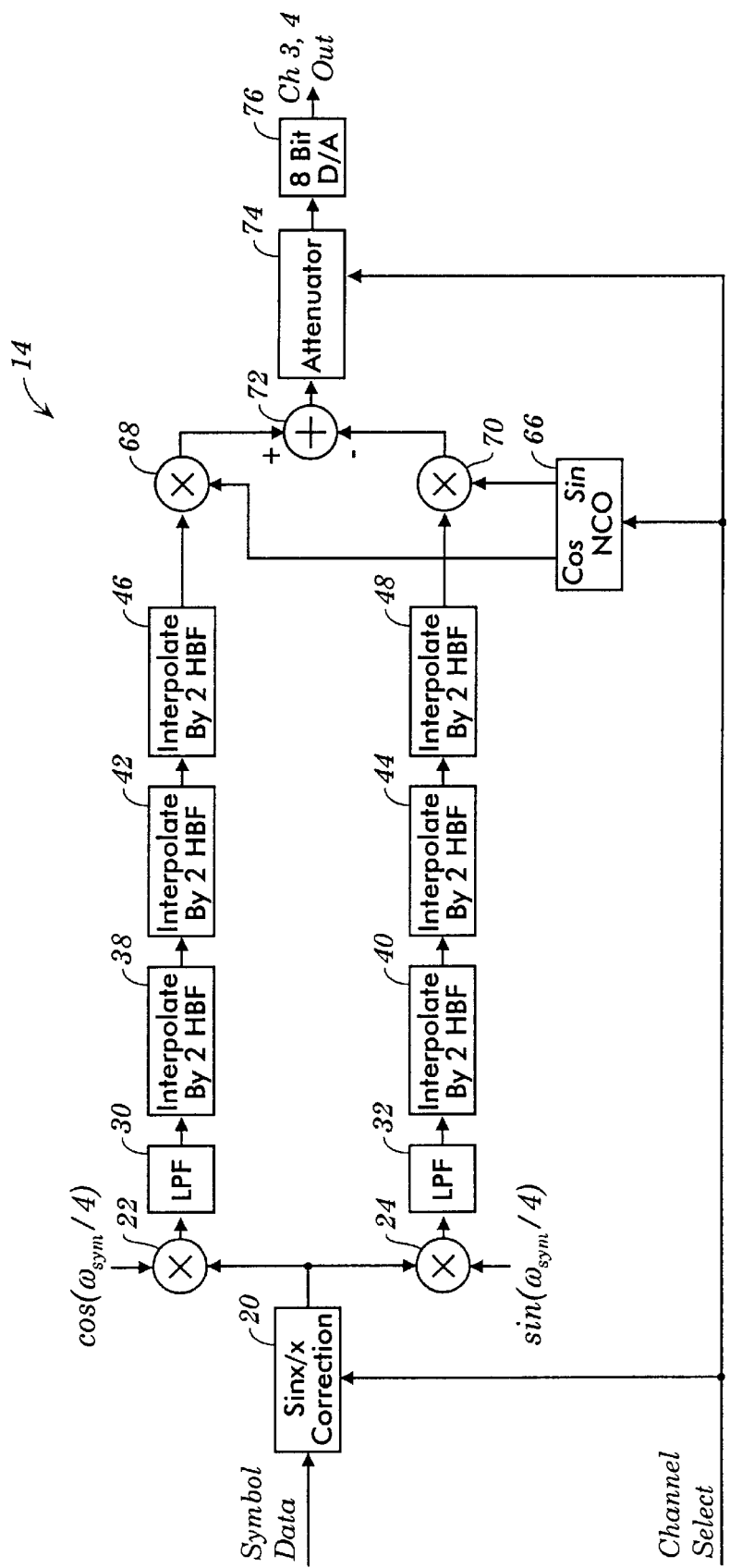
FIG. 2 is a block diagram showing the VSB digital signal modulator of FIG. 1 in additional detail.
Figure 3:
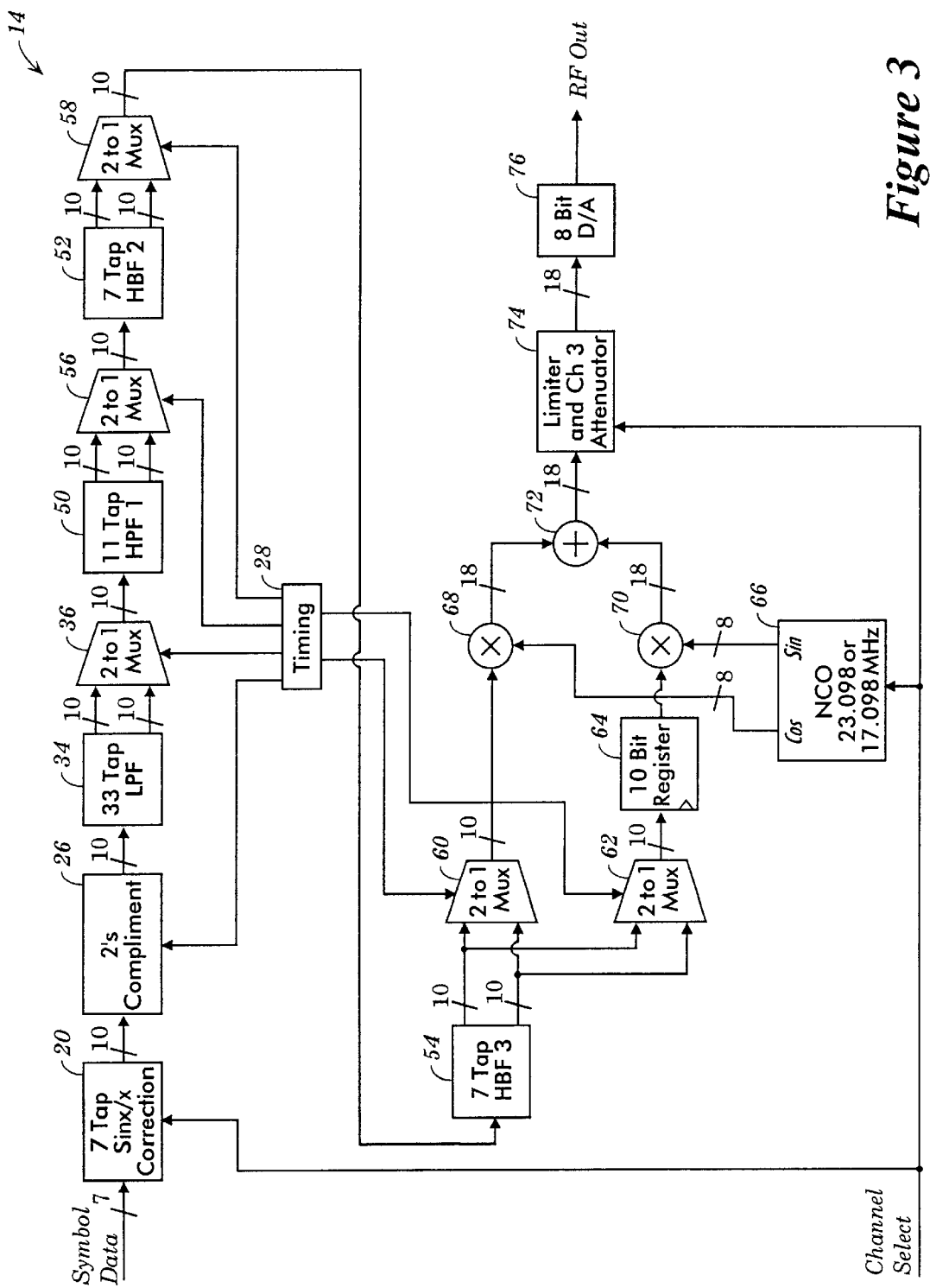
FIG. 3 is a more detailed block diagram of the VSB digital signal modulator of FIG. 2.

As shown in FIGS. 2 and 3, a sinx/x correction filter 20 is provided at a front end of the digital modulator 14. The sinx/x correction filter 20 may have seven taps and is provided to compensate for the sinx/x roll off created by the D/A converter discussed below. Because channel 3 requires a different sinx/x correction than does channel 4, the sinx/x correction filter 20 contains two sets of tap values selected by the channel select signal. For example, if the channel select signal is a logic level zero, the channel 3 taps are selected and, if the channel select signal is a logic level one, the channel 4 taps are selected.

The bits produced by application of these taps to the symbol data may be rounded to eleven bits and the most significant of these eleven bits may be discarded leaving a sinx/x correction output having ten bits. Even if this most significant bit were not discarded, the output of the sinx/x correction filter 20 will not exceed ten bits when the sinx/x correction filter 20 receives normal symbol data. Therefore, the most significant bit may be discarded without risk of overflow. Table 1 below shows an exemplary set of tap values for the sinx/x correction filter 20.

TABLE 1

| Tap | Ch 3 Value | Ch 4 Value |
|-----|------------|------------|
| 0   | −3         | −4         |
| 1   | 1          | 2          |
| 2   | −22        | −30        |
| 3   | 400        | 400        |
| 4   | −22        | −30        |
| 5   | 1          | 2          |
| 6   | −3         | −4         |

Figure 5A:
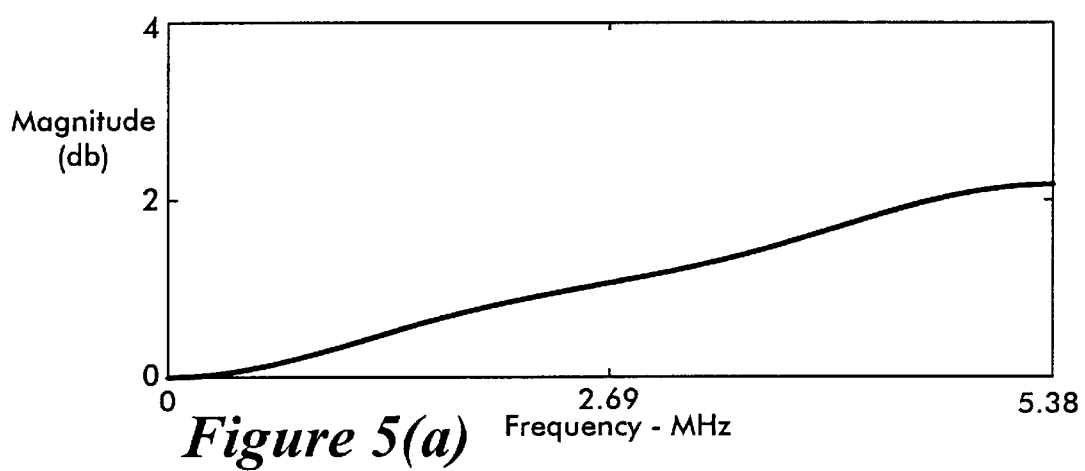
FIG. 5a illustrates the frequency response of the sinx/x correction filter of FIGS. 2 and 3 for channel 3.
Figure 5B:
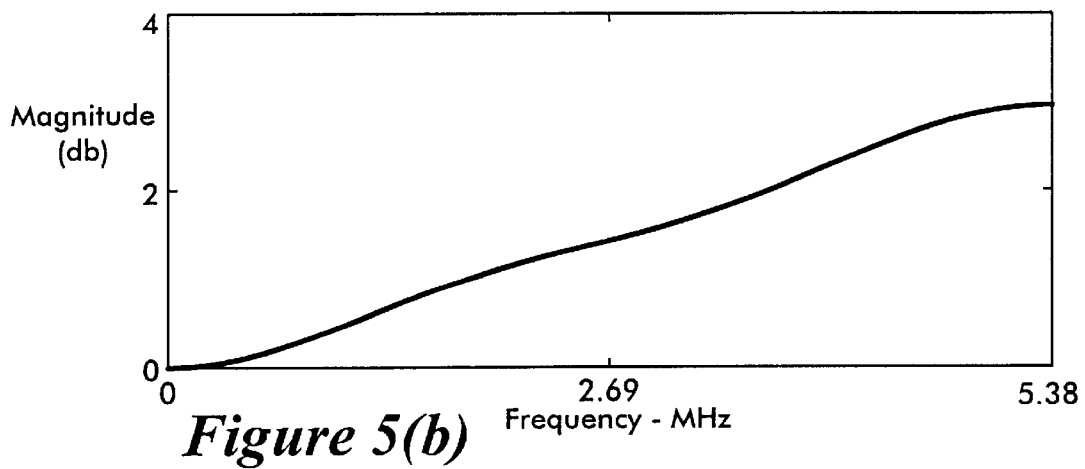
FIG. 5b illustrates the frequency response of the sinx/x correction filter of FIGS. 2 and 3 for channel 4.

The frequency response of the sinx/x correction filter 20 based upon the exemplary set of channel 3 tap values is shown in FIG. 5a, and the frequency response of the sinx/x correction filter 20 based upon the exemplary set of channel 4 tap values is shown in FIG. 5b.

The output of the sinx/x correction filter 20 is shifted by 2.69 MHZ, which is one-fourth of the symbol rate $f_{sym}$. This shift in frequency moves the DC pilot to the center of the spectrum shown in FIG. 4. The frequency shift is performed by multiplying the symbol data by $e^{j1/4\omega sym}$. This multiplication is implemented in FIG. 2 by a multiplier 22 which multiplies the data by $\cos(\omega_{sym}n/4)$ and a multiplier 24 which multiplies the data by $\sin(\omega_{sym}n/4)$ because $$e^{\frac{jn\omega_{sym}}{4}} = \cos\left(\frac{\omega_{sym}n}{4}\right) + j\sin\left(\frac{\omega_{sym}n}{4}\right). \quad (1)$$

Because the frequency shift is equal to one-fourth the symbol clock rate, the factor $\cos(\omega_{sym}n/4)$ applied by the multiplier 22 produces the following sequence:

1,0,−1,0,1,0,−1,0 . . .

and the factor $\sin(\omega_{sym}n/4)$ applied by the multiplier 24 produces the following sequence:

0,1,0,−1,0,1,0,−1 . . .

The two sequences can be interleaved because every other value in both sequences is zero. The resulting sequence is given by the following:

1,1,−1,−1,1,1,−1,−1 . . .

As shown in FIG. 3, this combined sequence may be implemented as a 2's complement circuit 26. The control signal from the timing block 28 turns on the 2's complement circuit 26 for two symbol clock cycles and off for two symbol clock cycles.

After the data is shifted in frequency, the real and imaginary parts of the data are filtered by low pass filters 30 and 32 as shown in FIG. 2. As shown in FIG. 3, the low pass filters 30 and 32 may be implemented, for example, as a single thirty-three tap low pass filter 34 because the real and imaginary data are interleaved at the output of the 2's complement circuit 26. The low pass filter 34 shapes the VSB output spectrum and has a filter roll-off that approximates the root-raised cosine roll-off of the ideal VSB output spectrum. The 3 db point of the low pass filter 34 is at 2.69

MHZ. In order to reduce the size of the low pass filter 34, the bandwidth of the low pass filter 34 is slightly wider than the 3 MHZ bandwidth of an ideal root-raised cosine filter. Table 2 below shows an exemplary set of tap values for the low pass filter 34, assuming that it is implemented as a thirty-three tap filter.

TABLE 2

| Tap | Value | Tap | Value | Tap | Value |
|---|---|---|---|---|---|
| 0 | −5 | 11 | 66 | 22 | −20 |
| 1 | −14 | 12 | 22 | 23 | −41 |
| 2 | −7 | 13 | −122 | 24 | 17 |
| 3 | 14 | 14 | −24 | 25 | 27 |
| 4 | 11 | 15 | 384 | 26 | −14 |
| 5 | −18 | 16 | 631 | 27 | −18 |
| 6 | −14 | 17 | 384 | 28 | 11 |
| 7 | 27 | 18 | −24 | 29 | 14 |
| 8 | 17 | 19 | −122 | 30 | −7 |
| 9 | −41 | 20 | 22 | 31 | −14 |
| 10 | −20 | 21 | 66 | 32 | −5 |

Figure 6:
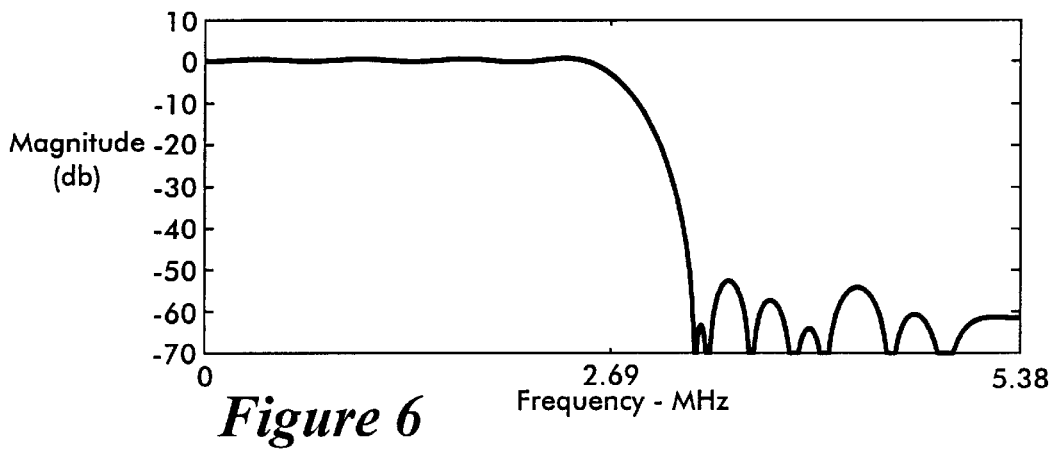
FIG. 6 illustrates the frequency response of the low pass filters of FIGS. 2 and 3.

FIG. 6 shows the frequency response of the low pass filter 34 based upon this exemplary set of thirty-three tap values.

As discussed previously, the real and imaginary interleaved at the output of the 2's complement circuit 26. When the real data are at the even taps of the low pass filter 34, the imaginary data are at the odd taps of low pass filter 34, and vice versa. Therefore, the low pass filter 34 has two outputs, an even tap output and an odd tap output. Both outputs are interleaved with the real and imaginary data, and these outputs may be rounded to eleven bits and limited to ten bits before being applied to a two-to-one mux 36. Such limiting will rarely occur.

In order to modulate the data, the sample rate should be increased to 86.08 MHZ, which is eight times the symbol data rate. The sample rate is increased in three stages, with each stage interpolating the data by two. Each interpolation stage includes a half band filter which removes the image of the data caused by the interpolation. Fewer filter taps are required if the interpolation and filtering are done in three steps instead of one.

Accordingly, as shown in FIG. 2, the outputs of the low pass filters 30 and 32 are supplied to corresponding interpolation and half band filters 38 and 40 which perform an interpsolation by two and which filter the interpolation results. The outputs of the interpolation and half band filters 38 and 40 are then supplied to corresponding interpolation and halfband filters 42 and 44 which also perform an interpolation by two and which filter the interpolation results, and the outputs of the interpolation and half band filters 42 and 44 are supplied to corresponding interpolation and half band filters 46 and 48 which likewise perform an interpolation by two and filter the interpolation results.

Interpolation by two inserts a zero in between each complex data symbol. The real and imaginary parts of the data symbols are then interleaved because every other data symbol is zero. Therefore, as shown in FIG. 3, only one half band filter 50 and the two-to-one mux 36 are required for the interpolation and half band filters 38 and 40, only one half band filter 52 and a two-to-one mux 56 are required for the interpolation and half band filters 42 and 44, and only one half band filter 54 and a two-to-one mux 58 are required for the interpolation and half band filters 46 and 48.

The two-to-one 36, under control of the timing block 28, interleaves the data by combining the even and odd tap outputs of the low pass filter 34, into one data stream with the imaginary data interleaved before the real data. The diagram below illustrates the data before and after the two-to-one mux 36.

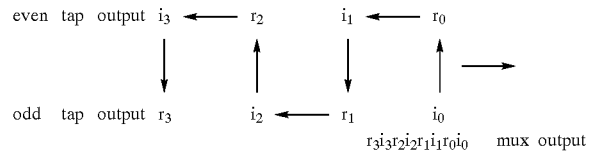

The half band filter 50 is implemented, for example, as a filter having eleven taps. Table 3 below shows an exemplary set of tap values for the half band filter 50, assuming that it is implemented as an eleven tap filter.

TABLE 3

| Tap | Value | Tap | Value |
|---|---|---|---|
| 0 | 29 | 6 | 619 |
| 1 | 0 | 7 | 0 |
| 2 | −134 | 8 | −134 |
| 3 | 0 | 9 | 0 |
| 4 | 619 | 10 | 29 |
| 5 | 1024 | | |

Figure 7A:
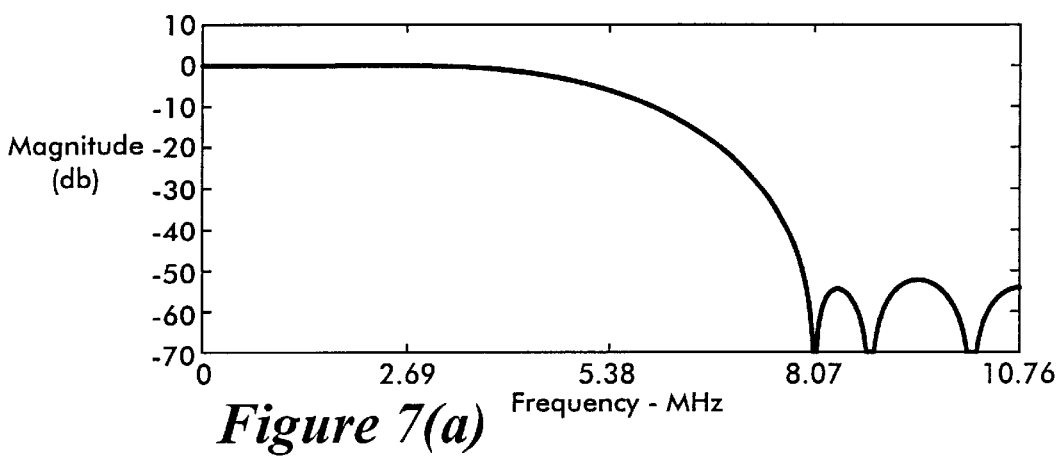
FIG. 7a illustrates the frequency response of the half band filter HBF 1 of FIGS. 2 and 3.

FIG. 7a shows the frequency response for the half band filter 50 based upon this set of exemplary tap values.

The two-to-one mux 56, under control of the timing block 28, interleaves the data from the half band filter 50 by combining the even and odd tap outputs of the half band filter 50 into one data stream with the imaginary data interleaved after real data. The diagram below illustrates the data before and after the two-to-one mux 56.

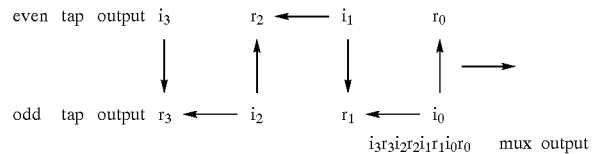

The half band filter 52 is implemented, for example, as a filter having seven taps. Table 4 below shows an exemplary set of tap values for the half band filter 52, assuming that it is implemented as an seven tap filter.

TABLE 4

| Tap | Value | Tap | Value |
|---|---|---|---|
| 0 | −9 | 4 | 73 |
| 1 | 0 | 5 | 0 |
| 2 | 73 | 6 | −9 |
| 3 | 128 | | |

Figure 7B:
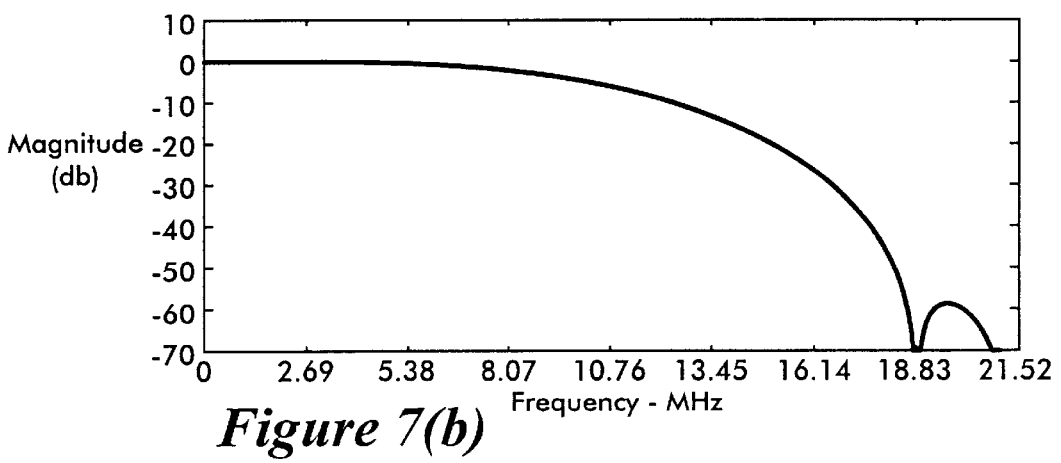
FIG. 7b illustrates the frequency response of the half band filter HBF 2 of FIGS. 2 and 3.

FIG. 7b shows the frequency response for the half band filter 52 based upon this set of exemplary tap values.

The two-to-one mux 58, under control of the timing block 28, interleaves the data from the half band filter 52 by combining the even and odd tap outputs of the half band filter 52 into one data stream with the imaginary data interleaved after real data. The diagram below illustrates the data before and after the two-to-one mux 58.

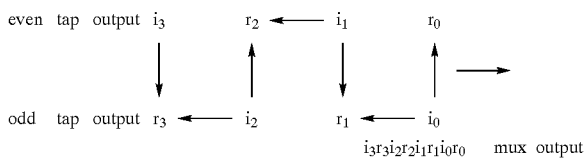

The half band filter 54 is implemented, for example, as a filter having seven taps. Table 5 below shows an exemplary set of tap values for the half band filter 54, assuming that it is implemented as an seven tap filter.

TABLE 5

| Tap | Value | Tap | Value |
| --- | --- | --- | --- |
| 0 | −1 | 4 | 9 |
| 1 | 0 | 5 | 0 |
| 2 | 9 | 6 | −1 |
| 3 | 16 | | |

Figure 7C:
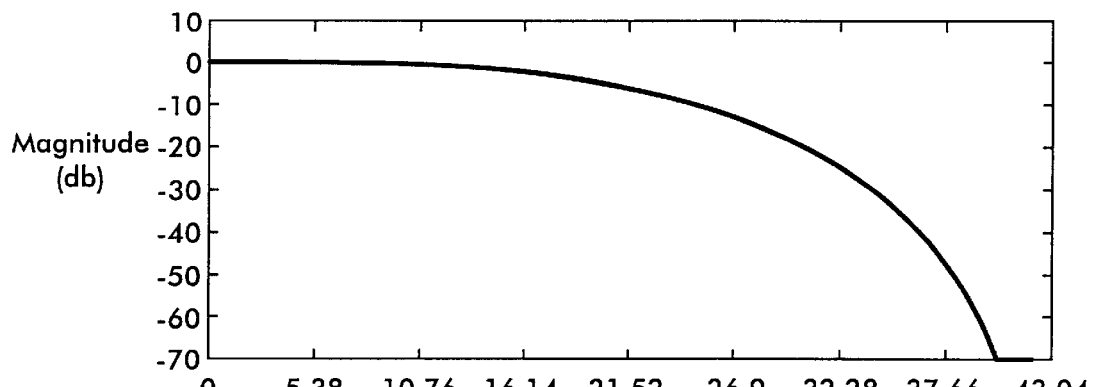
FIG. 7c illustrates the frequency response of the half band filter HBF 3 of FIGS. 2 and 3.

FIG. 7c shows the frequency response for the half band filter 54 based upon this set of exemplary tap values.

The frequency response of each of the half band filters 50, 52, and 54 is 6 db down at half of the Nyquist frequency for each of the half band filters 50, 52, and 54. Also, each of the half band filters 50, 52, and 54 has only one odd tap. Because the real and imaginary data are interleaved, the real data are in the even taps when the imaginary data are in the odd taps and vice versa. Therefore, the half band filters 50, 52, and 54 also have two outputs, an even tap output and an odd tap output. Both outputs of each of the half band filters 50, 52, and 54 are interleaved with the real and imaginary data. The outputs of each of the two-to-one multiplexers are rounded to eleven bits and limited to ten bits.

Two two-to-one muxes 60 and 62 arranged in parallel follow the half band filter 54. The two-to-one muxes 60 and 62, under control of the timing block 28, convert the two data streams interleaved with real and imaginary data to two data streams that are either real or imaginary. The diagram below illustrates the data before and after the two-to-one mux 60.

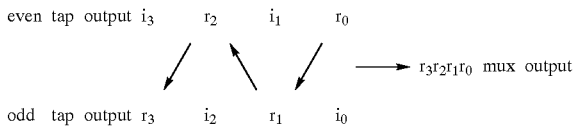

Similarly, the diagram below illustrates the data before and after the two-to-one mux 62.

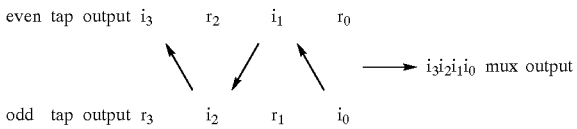

At the two-to-one mux 36, the imaginary data is inserted before the real data. This operation causes the real data and imaginary data to be skewed by one clock cycle. The two-to-one mux 56 and the two-to-one mux 58 insert the real data before the imaginary data so that the one clock cycle skew does not grow. A ten-bit register 64 shown in FIG. 3 is placed after the two-to-one mux 62 in order to provide a one clock cycle delay to remove this skew.

A numerically controlled oscillator 66 has two outputs, an eight-bit sine wave output and an eight-bit cosine wave output. The phase accumulator of the numerically controlled oscillator 66 is sixteen bits. For channel 3, the phase increment is 17,582, and the output frequency is 23.098348 MHZ. For channel 4, the phase increment is 13,015, and the output frequency is 17.098453 MHZ. The frequency of the pilot ($f_{out}$) is determined according to the following equation:

$$f_{out} = 8f_1 - (f_2 + \tfrac{1}{4}f_1) \tag{2}$$

where $f_1$ represents the symbol frequency, where the factor $8f_1$ results from the three interpolations-by-two, where the factor $f_1/4$ results from the 2's complement circuit 26, and where the factor $f_2$ represents the output of the numerically controlled oscillator 66. Accordingly, the pilot frequency for channel 3 is 60.308995 MHZ, and the pilot frequency for channel 4 is 66.308890 MHZ. Because the phase accumulator is only sixteen bits, the pilot frequencies are slightly below the ideal pilot frequencies. The channel select signal controls the NCO frequency. For example, a logic level zero selects channel 3, and a logic level one selects channel 4.

The complex data is modulated by the quadrature output of the numerically controlled oscillator 66. A multiplier 68 multiplies the ten-bit real component of the symbol data from the two-to-one mux 60 by the eight-bit cosine output of the numerically controlled oscillator 66. A multiplier 70 multiplies the ten-bit imaginary component of the symbol data from the two-to-one mux 62 and the ten-bit register 64 by the eight-bit sine output of the numerically controlled oscillator 66. A summer 72 subtracts the output of the multiplier 70 from the output of the multiplier 68 which is equivalent to shifting the frequency spectrum of the complex data and its conjugate by the NCO frequency and summing the two together. This operation is shown by the following equation:

$$x_n = \frac{(r_n + ji_n)e^{jn\omega_{nco}} + (r_n - ji_n)e^{-jn\omega_{nco}}}{2} \tag{3}$$
$$= r_n \cos(\omega_{nco} n) - i_n \sin(\omega_{nco} n)$$

Figure 8A:
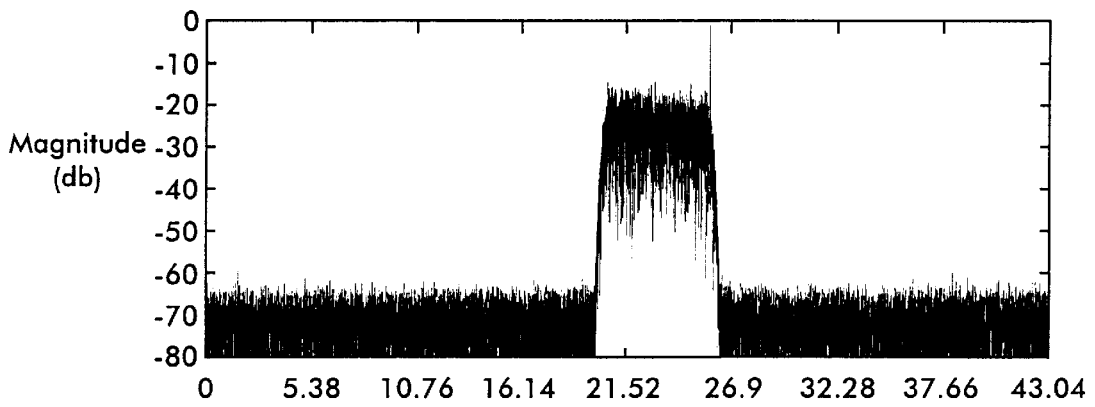
FIG. 8a illustrates the frequency spectrum of the modulated data for channel 3.
Figure 8B:
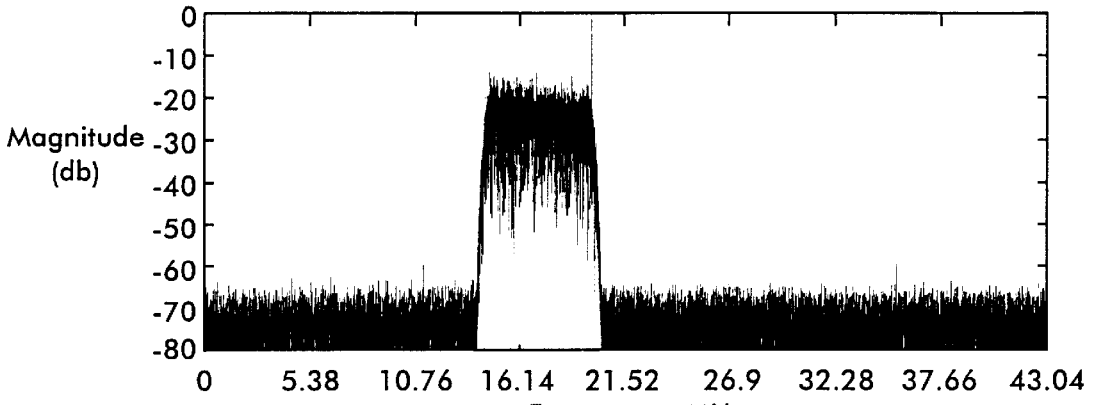
FIG. 8b illustrates the frequency spectrum of the modulated data for channel 4.

The modulated data has a center frequency equal to the output frequency of the numerically controlled oscillator 66. The pilot frequency is 2.69 MHZ above the output frequency of the numerically controlled oscillator 66. FIG. 8a shows the frequency spectrum of the modulated data on channel 3, and FIG. 8b shows the frequency spectrum of the modulated data on channel 4.

The output of the summer 72 is attenuated by an attenuator 74 and converted to an analog signal by a digital-to-analog converter 76. The attenuation due to the sinx/x roll-off of the digital-to-analog converter 76 can be greater for channel 4 than it is for channel 3. Also, the DC gain of the sinx/x correction filter 20 can be slightly higher for channel 3 than for channel 4. Therefore, if these conditions exist, the signal power after the digital-to-analog converter 76 is greater. (for example, by about 3 db) for channel 3 than for channel 4. Accordingly, the attenuator 74 is provided to apply a suitable attenuation (such as 23/32) to make the output power for channel 3 and channel 4 substantially equal. Thus, when the channel select signal indicates channel 3, the attenuation applied by the attenuator 74 is made active and when the channel select signal indicates channel 4, the attenuation applied by the attenuator 74 is made inactive. The attenuator 74 may also be arranged to round the data to nine bits and to limit the data to eight bits regardless of channel.

Figure 10:
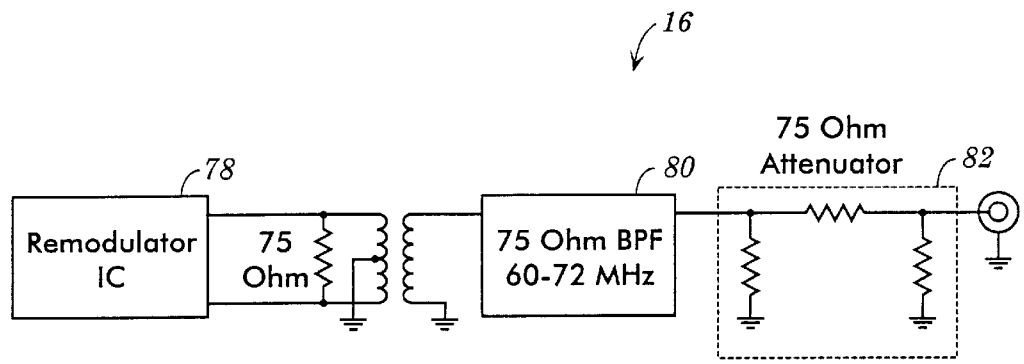

The digital-to-analog converter 76 has an eight bit resolution and a differential output. This differential output is converted to a single ended output through a 1:1 transformer 78 of the output circuit 16 as shown in FIG. 10. The side of the 1:1 transformer 78 coupled to the digital-to-analog converter 76 has a grounded center tap and the output impedance of the digital-to-analog converter 76 is set by placing a 75Ω resistor across the output of the digital-to-analog converter 76.

Figure 9A:
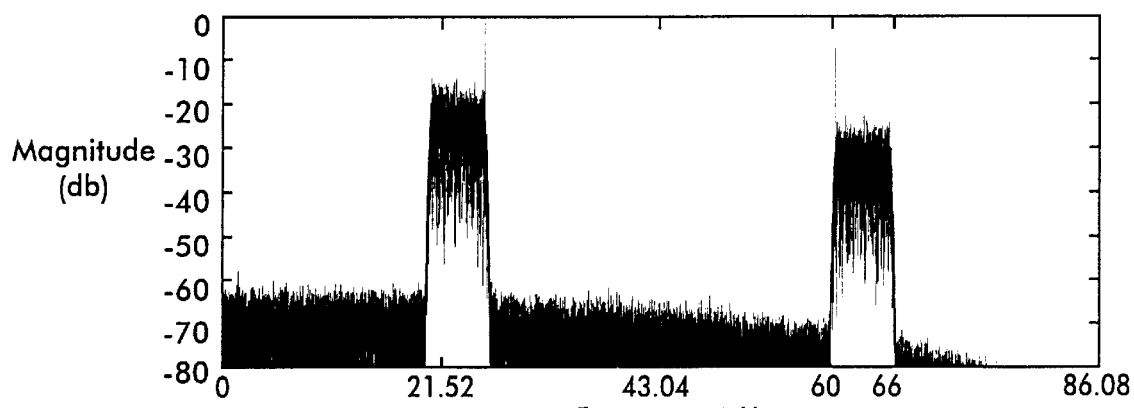
FIG. 9a illustrates the frequency spectrum of the D/A output for channel 3.
Figure 9B:
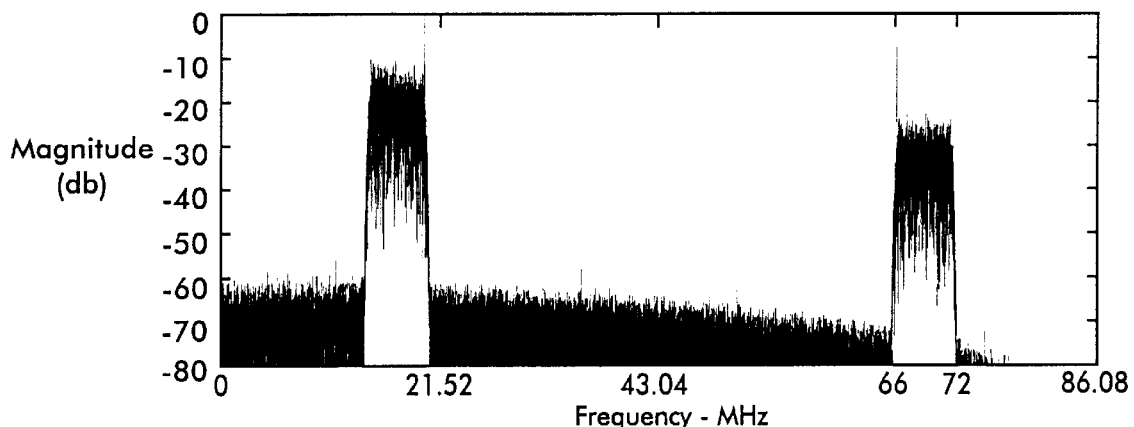
FIG. 9b illustrates the frequency spectrum of the D/A output for channel 4; and, FIG. 10 is a block diagram of an output circuit for the VSB digital signal modulator of FIGS. 2 and 3.

FIG. 9a shows the frequency spectrum at the output of the digital-to-analog converter 76 for channel 3, and FIG. 9b shows the frequency spectrum at the output of the digital-to-analog converter 76 for channel 4. The frequency of the numerically controlled oscillator 66 may be chosen so that the first image of the modulated data above the Nyquist frequency falls substantially in either channel 3 or channel 4. The sinx/x correction imposed by the sinx/x correction filter 20 may be also designed to correct this image. The signal-to-noise ratio of the first image is also good enough to be received by the receiver. Therefore, the first image may be used as the modulated output and the fundamental output of the digital-to-analog converter 76 can be ignored.

Accordingly, a bandpass filter 80 of the output circuit 16 as shown in FIG. 10 is arranged to remove the modulated data below channels 3 and 4 and all images above channels 3 and 4. An attenuator 82 lowers the signal power to a nominal 0 dbmv.

Certain modifications and alternatives of the present invention have been discussed above. Other modifications and alternatives will occur to those practicing in the art of the present invention. Accordingly, the description of the present invention is to be construed as illustrative only and is for the purpose of teaching those skilled in the art the best mode of carrying out the invention. The details maybe varied substantially without departing from the spirit of the invention, and the exclusive use of all modifications which are within the scope of the appended claims is reserved.

What is claimed is:

1. A system for supplying a compressed digital signal to a digital television receiver comprising:
   a source of compressed baseband signal;
   an encoder that encodes the baseband signal in a digital television format, wherein the baseband signal has a frequency;
   a first frequency shifter that shifts the frequency of the encoded baseband signal;
   a root raised cosine filter that filters the frequency shifted encoded baseband signal;
   a first interpolator that interpolates an output of the root raised cosine filter;
   a second interpolator that interpolates an output of the first interpolator;
   a third interpolator that interpolates an output of the second interpolator; and,
   a second frequency shifter that shifts a frequency of an output of the third interpolator.

2. The system of claim 1 wherein the encoder provides the baseband signal at a frequency $f_1$, and wherein the first frequency shifter shifts the baseband signal by $f_1/4$.

3. The system of claim 2 wherein the first interpolator interpolates by two, wherein the second interpolator interpolates by two, and wherein the third interpolator interpolates by two.

4. The system of claim 2 wherein the first, second, and third interpolators collectively interpolate by eight.

5. The system of claim 4 wherein the first and second frequency shifters and the first, second, and third interpolators effectively operate in accordance with the following equation:

$$f_{out}=8f_1-(f_2+¼f_1)$$

where $8f_1$ results from the first, second, and third interpolators, where $f_1/4$ results from the first frequency shifter, and where $f_2$ is supplied by the second frequency shifter.

6. The system of claim 1 wherein the root raised cosine filter has a response that rolls off at about $f_1/4$ and substantially no roll off at DC.

7. The system of claim 6 wherein the first frequency shifter shifts the baseband signal by $f_1/4$.

8. The system of claim 7 wherein the first, second, and third interpolators collectively interpolate by eight.

9. The system of claim 8 wherein the first and second frequency shifters and the first, second, and third interpolators effectively operate in accordance with the following equation:

$$f_{out}=8f_1-(f_2+¼f_1)$$

where $8f_1$ results from the first, second, and third interpolators, where $f_1/4$ results from the first frequency shifter, and where $f_2$ is supplied by the second frequency shifter.

10. The system of claim 1 further comprising a sinx/x correction coupled between the encoder and the first interpolator, wherein the sinx/x correction provides compensation for the sinx/x roll off created by processing in the system.

11. The system of claim 10 wherein the root raised cosine filter has a response that rolls off at about $f_1/4$ and substantially no roll off at DC.

12. The system of claim 10 wherein the encoder provides the baseband signal at a frequency $f_1$, and wherein the first frequency shifter shifts the baseband signal by $f_1/4$.

13. The system of claim 12 wherein the first, second, and third interpolators collectively interpolate by eight.

14. The system of claim 13 wherein the first and second frequency shifters and the first, second, and third interpolators effectively operate in accordance with the following equation:

$$f_{out}=8f_1-(f_2+¼f_1)$$

where $8f_1$ results from the first, second, and third interpolators, where $f_1/4$ results from the first frequency shifter, and where $f_2$ is supplied by the second frequency shifter.

15. The system of claim 1 wherein the first interpolator interpolates by two, wherein the second interpolator interpolates by two, and wherein the third interpolator interpolates by two.

16. A method of supplying a compressed digital signal to a digital television receiver comprising:
   encoding a baseband signal in a digital television format, wherein the baseband signal has a symbol frequency;
   increasing the symbol frequency of the encoded baseband signal to produce an intermediate frequency signal, wherein the increasing of the symbol frequency of the encoded baseband signal includes three interpolations by two of the encoded baseband signal; and,
   modulating the intermediate frequency signal with a channel selection frequency signal so as to produce an output signal having the frequency of a selected channel.

17. The method of claim 16 wherein the baseband signal has a symbol frequency $f_1$, and wherein the increasing of the symbol frequency of the encoded baseband signal comprises shifting the symbol frequency of the baseband signal by $f_1/4$.

18. The method of claim 16 wherein the baseband signal has a symbol frequency $f_1$, and wherein the output signal has a frequency $f_{out}$ given by the following equation:

$$f_{out} = 8f_1 - (f_2 + \tfrac{1}{4}f_1)$$

where $8f_1$ results from the three interpolations, where $f_1/4$ results from a frequency shifting of the encoded baseband signal, and where $f_2$ is the frequency of the channel selection frequency signal.

19. The method of claim 16 further comprising low pass filtering the encoded baseband signal, wherein the baseband signal has a symbol frequency $f_1$, and wherein the low pass filtering has a response that rolls off at about $f_1/4$.

20. The method of claim 19 wherein the output signal has a frequency $f_{o1}$ given by the following equation:

$$f_{out} = 8f_1 - (f_2 + \tfrac{1}{4}f_1)$$

where $8f_1$ results from the three interpolations, where $f_1/4$ results from a frequency shifting of the encoded baseband signal, and where $f_2$ is the frequency of the channel selection frequency signal.

21. The method of claim 19 wherein the increasing of the symbol frequency of the encoded baseband signal comprises shifting the symbol frequency of the baseband signal by $f_1/4$.

22. The method of claim 16 further comprising sinx/x correcting the encoded baseband signal, wherein the sinx/x correction compensates for the sinx/x roll off created by processing downstream of the sinx/x correction.

23. The method of claim 22 further comprising low pass filtering the encoded baseband signal, wherein the baseband signal has a symbol frequency $f_1$, and wherein the low pass filtering has a response that rolls off at about $f_1/4$.

24. The method of claim 22 wherein the baseband signal has a symbol frequency $f_1$, and wherein the increasing of the symbol frequency of the encoded baseband signal comprises shifting the symbol frequency of the baseband signal by $f_1/4$.

25. The method of claim 22 wherein the baseband signal has a symbol frequency $f_1$, and wherein the output signal has a frequency $f_{out}$ given by the following equation:

$$f_{out} = 8f_1 - (f_2 + \tfrac{1}{4}f_1)$$

where $8f_1$ results from the three interpolations, where $f_1/4$ results from a frequency shifting of the encoded baseband signal, and where $f_2$ is the frequency of the channel selection frequency signal.

26. The method of claim 16 wherein the output signal contains modulated data below the selected channel and an image at the selected channel, and wherein the method comprises filtering of the output signal to remove the modulated data and to pass the image.

27. A method of producing an electrical signal comprising the following:

(i) encoding a signal in a digital television format, wherein the signal has a symbol frequency $f_1$;

(ii) shifting the frequency of the encoded signal by an amount permitting root raised cosine filtering;

(iii) root raised cosine filtering the shifted encoded signal;

(iv) increasing the frequency of the filtered and shifted encoded signal to produce an intermediate frequency signal; and, (v) modulating the intermediate frequency signal with a channel selection frequency signal so as to produce the electrical signal at the frequency of a selected channel.

28. The method of claim 27 wherein the frequency of the shifted encoded signal is increased by interpolation, and wherein the interpolation comprises three interpolations by two.

29. The method of claim 27 wherein the electrical signal has a frequency $f_{out}$ given by the following equation:

$$f_{out} = 8f_1 - \left(f_2 + \frac{1}{4}f_1\right)$$

where $8f_1$ results from the increasing of the frequency of the shifted encoded signal, where $f_1/4$ results from the frequency shifting, and where $f_2$ is the frequency of the channel selection frequency signal.

30. The method of claim 27 wherein the root raised cosine filtering has a response that rolls off at about $f_1/4$ and substantially no roll off at DC.

31. The method of claim 30 wherein the frequency of the shifted encoded signal is increased by interpolation, and wherein the interpolation comprises three interpolations by two.

32. The method of claim 30 wherein the electrical signal has a frequency $f_{out}$ given by the following equation:

$$f_{out} = 8f_1 - \left(f_2 + \frac{1}{4}f_1\right)$$

where $8f_1$ results from the increasing of the frequency of the shifted encoded signal, where $f_1/4$ results from the frequency shifting, and where $f_2$ is the frequency of the channel selection frequency signal.

33. The method of claim 27 wherein the encoded signal is sinx/x corrected, and wherein the sinx/x correction compensates for the sinx/x roll off created by processing of the electrical signal downstream of the sinx/x correction.

34. The method of claim 33 wherein the root raised cosine filtering has a response that rolls off at about $f_1/4$ and substantially no roll off at DC.

35. The method of claim 33 wherein the frequency of the shifted encoded signal is increased by interpolation, and wherein the interpolation comprises three interpolations by two.

36. The method of claim 33 wherein the electrical signal has a frequency $f_{out}$ given by the following equation:

$$f_{out} = 8f_1 - \left(f_2 + \frac{1}{4}f_1\right)$$

where $8f_1$ results from the increasing of the frequency of the shifted encoded signal, where $f_1/4$ results from the frequency shifting, and where $f_2$ is the frequency of the channel selection frequency signal.

37. The method of claim 27 further comprising filtering so as remove data below the selected channel and so as to leave an image of the data as the electrical signal.

38. The method of claim 27 wherein the shifting of the frequency of the encoded signal by an amount permitting root raised cosine filtering comprises shifting of the frequency of the encoded signal by $f_1/4$.

* * * * *